United States Patent
Reuschen et al.

(10) Patent No.: US 7,990,996 B2
(45) Date of Patent: Aug. 2, 2011

(54) DATA TRANSMISSION

(75) Inventors: Rolf Reuschen, Neuffen (DE); Bernhard Schmid, Ebersbach (DE)

(73) Assignee: Hirschmann Electronics GmbH, Neckartenzlingen (DE)

( * ) Notice: Subject to any disclaimer, the term of this patent is extended or adjusted under 35 U.S.C. 154(b) by 2296 days.

(21) Appl. No.: 10/416,306

(22) PCT Filed: Oct. 10, 2001

(86) PCT No.: PCT/EP01/11690
§ 371 (c)(1), (2), (4) Date: Sep. 15, 2003

(87) PCT Pub. No.: WO02/39676
PCT Pub. Date: May 16, 2002

(65) Prior Publication Data
US 2004/0066798 A1     Apr. 8, 2004

(30) Foreign Application Priority Data

Nov. 10, 2000   (DE) ................. 100 55 938

(51) Int. Cl.
*H04L 12/413* (2006.01)
*H04L 12/66* (2006.01)
*H04L 25/00* (2006.01)
*H04J 3/16* (2006.01)
*H04J 3/22* (2006.01)
*H04B 3/00* (2006.01)
*H03B 19/00* (2006.01)

(52) U.S. Cl. ........ 370/447; 370/463; 370/470; 375/258; 327/113

(58) Field of Classification Search .................. 370/447, 370/448, 463, 470, 503, 445, 395.53; 375/258
See application file for complete search history.

(56) References Cited

U.S. PATENT DOCUMENTS

| | | | | |
|---|---|---|---|---|
| 4,063,220 | A |   | 12/1977 | Metcalfe et al. |
| 4,628,311 | A | * | 12/1986 | Milling ...................... 370/447 |
| 4,661,950 | A |   | 4/1987 | Kobayashi et al. |
| 5,187,605 | A | * | 2/1993 | Shikata et al. ................ 398/99 |
| 5,265,094 | A | * | 11/1993 | Schmickler et al. .......... 370/447 |
| 5,337,310 | A | * | 8/1994 | Selyutin ....................... 370/447 |
| 5,396,654 | A | * | 3/1995 | Tripp et al. ................... 455/557 |
| 5,436,903 | A | * | 7/1995 | Yang et al. ................... 370/448 |

(Continued)

FOREIGN PATENT DOCUMENTS

EP         0 087 664         9/1983

(Continued)

OTHER PUBLICATIONS

Demartini C et al: "The EN50170 standard for a European fieldbus", Computer Standards and Interfaces, Elsevier Sequoia. Lausanne, CH, vol. 19, No. 5-6, Oct. 15, 1998, pp. 257-273, XP004144061, ISSN: 0920-5489, the whole document.

(Continued)

*Primary Examiner* — Seema S Rao
*Assistant Examiner* — Xavier Szewai Wong
(74) *Attorney, Agent, or Firm* — Fulbright & Jaworski L.L.P.

(57) ABSTRACT

A data transmission network having at least two devices to transmit and receive data with the devices connected via a passive transmission device so that the data is transmitted between the devices using the passive transmission device. Each of the devices includes a converter to control data transmission using the passive transmission device.

22 Claims, 3 Drawing Sheets

U.S. PATENT DOCUMENTS

| | | | |
|---|---|---|---|
| 5,523,704 A | 6/1996 | So | |
| 5,640,511 A | 6/1997 | Botzenhardt et al. | |
| 5,691,714 A * | 11/1997 | Mehnert et al. | 340/870.05 |
| 5,799,040 A * | 8/1998 | Lau | 375/258 |
| 6,163,533 A * | 12/2000 | Esmailzadeh et al. | 370/342 |
| 6,246,702 B1 * | 6/2001 | Fellman et al. | 370/503 |
| 6,256,761 B1 * | 7/2001 | Deix et al. | 714/727 |
| 6,262,993 B1 * | 7/2001 | Kirmse | 370/463 |
| 6,493,351 B1 * | 12/2002 | Shideler | 370/438 |
| 6,504,854 B1 * | 1/2003 | Hofmann et al. | 370/518 |
| 6,539,028 B1 * | 3/2003 | Soh et al. | 370/445 |
| 6,680,631 B2 * | 1/2004 | Solomon | 327/113 |
| 7,042,914 B2 * | 5/2006 | Zerbe et al. | 370/516 |

FOREIGN PATENT DOCUMENTS

EP    0 965 951 A2    12/1991

OTHER PUBLICATIONS

Cena G et al: "A distributed mechanism to improve fairness in CAN networks", Factory Communication Systems, 1995. WFCS '95, Proceedings., 1995 IEEE International Workshop on Leysin, Switzerland Oct. 4-6, 1995, New York, NY, USA, IEEE, US, Oct. 4, 1995, pp. 3-11, XP010154278, ISBN: 0-7803-3059-5.

* cited by examiner

DATA TRANSMISSION

BACKGROUND OF THE INVENTION

1. Field of the Invention

The present invention relates to a data transmission network having several devices interconnected via a passive transmission device, and more particularly to a network formed using a passive transmission device without an active distributor where each device connected to the passive transmission device includes a converter to control data transfer.

2. Description of the Related Technology

Especially in the area of process automation, for networking of hardware (see FIG. 2, where devices are labeled with reference number 1) field bus systems (reference number 2 of FIG. 2) are used which have been developed and designed especially for these applications. The devices are for example controls, drives, input or output systems. The field bus system is characterized by its mechanical durability, its invulnerability to electrical noise, and by installation, start-up and maintenance simplicity. The field bus system proves effective in the area of rough ambient conditions.

In the use of field bus systems there is a problem for the user in that there are a diversity and multiplicity of different field bus systems which may all be mutually incompatible. Communications beyond the boundaries of a field bus system is technically extremely complex and thus can have poor efficiency. Moreover the choice of a certain field bus system for the final user in practice has the disadvantage that he is tied to a single manufacturer; this in turn can entail disadvantages with respect to costs in procurement, maintenance and service. In field bus systems at present there are standard data transmission technologies (for example, ANSI-TIA-EIA-485-A) to which are added additional restrictions, for example methods of access to transmission devices, mechanical and electrical requirements for cable connectors and plugs, connector pin assignments, data rates, maximum numbers of devices on a field bus and allowable line lengths.

Along with field bus systems, especially in the field of office communications there can be a computer network ETHERNET which works according to standard IEEE 802.3/Iso/IEC 8802-3 specifications which together with Transmission Control Protocol/Internet Protocol (TCP/IP) has been developed into a dominant network technology enabling worldwide data communications using the Internet between the most varied devices (for example, Personal Computers (PC), workstations, mainframes with different operating systems, etc.). For example, as shown in FIG. 3, there can be network bus systems with active distributors. In these bus systems there are point-to-point connections in which the devices with reference numbers 1 are connected to an active distributor via connections 2. Here data are relayed from one device to another by active distributor 5.

Such an active distributor is not used in process automation or in general in applications of automation engineering, since these distributors represent an additional cost factor and also reduce the reliability of the entire system.

SUMMARY OF THE INVENTION

An object of the invention is to make available a network with several connected devices which combines advantages of a field bus system with advantages of a Local Area Network (LAN) system such as the ETHERNET.

The present invention provides that all the devices connected to the transmission device have included systems, especially a converter, with which the transfer of data delivered by the transmission device to the devices and/or the data delivered by the devices to the transmission device is controlled. Thus, it is possible on the one hand to use components which have been proven effective in process automation (for example, data lines, connecting hardware, electronic modules, etc.) and which are therefore durable, and on the other hand take advantage of the high data rates and worldwide data communication and compatibility of the ETHERNET. Since according to the present invention multiple devices are connected to the transmission device, a passive, durable network without active distribution elements is formed so that costs can also be reduced. An especially favored transmission medium (transmission device) is a twisted two-wire line that can be economically procured and easily laid.

In other words, the advantage accrues by use of the invention that the transmission technology of modern field bus systems is used for ETHERNET transport of data, i.e., the world of the field bus system is interconnected to that of the ETHERNET. To do this, the invention provides that there is a converter included with each device that connects the two worlds to one another and uses conventional cabling techniques of the field bus system.

This invention relates to mechanisms for coding transmitted data. Coding, especially line coding, is used to match the properties of the transmitted signal which bears the useful data to the transmission device and to enable the receiving device to be synchronized to the network data. Here, for example, an ETHERNET can use Manchester encoding which leads to a distribution of spectral energy of the transmitted signal in the range above 5 MHz. The data rates of field bus systems are in the range of roughly 10 kilobits per second up to a few megabits per second so that data lines designed for field bus systems are designed for transmission of lower signal frequencies as are ETHERNET data lines so that the converter preferably uses Non-Return to Zero (NRZ) coding, and thereby the required bandwidth of the data line is cut in half. In this way high data rates input to the transmission device can be transmitted to the connected device to be processed with high speed. At the same time it is possible to transmit from one connected device a generated high data rate with the required speed via the transmission device to another connected device.

This invention also relates to an arrangement for collision detection, if at least two devices access the network at the same time, is provided so there can be a reaction thereto. A collision occurs when at least two connected devices try to access the network at the same time and as a result their transmitted data are mutually destroyed. A collision must be recognized by the accessing devices in order to definitively break off the transmission process and after a definable time interval to again attempt transmission in order to avoid data loss. Thus it is feasible on the one hand for transmitted data to be fed into the field bus via current sources with high impedance. In a collision the transmitted data signals from colliding devices are superimposed and lead to an increase of the average value of the signal voltage which can be detected by the corresponding arrangement.

The invention further relates to providing a corresponding field bus termination so a defined rest level is impressed on the data line. Those connected devices which are not transmitting have for this purpose shifted line drivers into a high impedance state. Transmitting devices actively inject only the logic level which deviates from the rest level with low impedance into the data line. If a logic level that is identical to the rest level is to be sent, the line driver is shifted into the high impedance state and the desired logic level is impressed by the line terminations with relatively high impedance onto the data line. In this way dominant and recessive logic levels are formed so that if there is a collision the logic levels dominate which have been impressed with low impedance on the data line by a transmitting device that can be detected by comparison of transmitted data and received data. To do this there are mechanisms for comparison of transmitted and received data that are part of each device.

This invention additionally relates to providing mechanisms that assign a variable bit pattern for the device to a data packet consisting of a definable bit pattern which is to be received by a certain device at the start of the data packet, or a variable bit pattern is prefixed to the data packet at the start.

Data packets known to date (for example according to IEEE 802.3) consist for example of a seven (7) bytes preamble, one byte start frame delimiter, six (6) bytes destination address, six (6) bytes source address, 46 to 1500 bytes of data and of a check sum with a length of four (4) bytes. One such structure for the data packet has the disadvantage that the data of two colliding devices reliably differ at the earliest in the source address. At this instant, up to twenty (20) bytes can have been transmitted before a collision between two devices is reliably recognized, so that an unallowably long collision detection time arises therefrom.

The present invention provides for the first bytes of the data packet which consist for example of a sequence of 10s and do not contain information to be replaced by a variable bit pattern. This bit pattern can consist of any variable bit pattern, the bit pattern belonging to the device will thus differ from the bit pattern of all other devices involved in the collision. Thus collision detection by the converter incorporated with each device is possible by simple comparison of the transmitted data and received data. The comparison is watched at each device to confirm that this variable bit pattern included in a sequence of 10s, especially the original sequence of 10s remains unchanged.

The invention further relates to generation and assignment of the variable bit pattern which takes place automatically. By automatically producing the variable bit pattern according to the random principle it is on the one hand ensured that the user of the device need not trigger this process by himself, but that this process proceeds automatically in the background. Generation according to a random principle for example moreover has the advantage that it is ensured that two devices do not receive the same destination address so that collision detection can be effectively carried out.

The invention also relates to providing a recessive logic level at the start of a data bit pattern of the data packet that is impressed likewise with low impedance for a fraction of the bit pattern duration.

When using collision detection based on dominant and recessive logic levels, problems can occur that by the high impedance impression of the recessive logic level, especially with connection of a very large number of devices to the data line and the associated high capacitive load, the behavior of the signal level can be strongly distorted and thus the quality of data transmission can be adversely affected. To address this problem an aspect of the invention provides that the recessive logic level at the start of the data bit pattern for a fraction of the bit pattern duration is likewise impressed with low impedance, while for the remaining duration of the data bit pattern in the device there are systems (e.g., transceivers) with which this duration of the data bit pattern is switched with high impedance. Thus, signal distortions can be effectively prevented by the corresponding choice of the duration of this fraction of the bit pattern duration without adversely affecting collision detection.

The invention further relates to providing mechanisms for serial-parallel conversion or vice versa of the data to be delivered or to be received. Thus, data are transmitted from the "field bus world" into the "ETHERNET world" and vice versa. This conversion applies both to the transmitted data and also to the received data.

BRIEF DESCRIPTION OF THE DRAWINGS

A network to which the invention is however not limited and which can be modified within the framework of the below provided description as explained using the figures.

DETAILED DESCRIPTION

Figure 1:
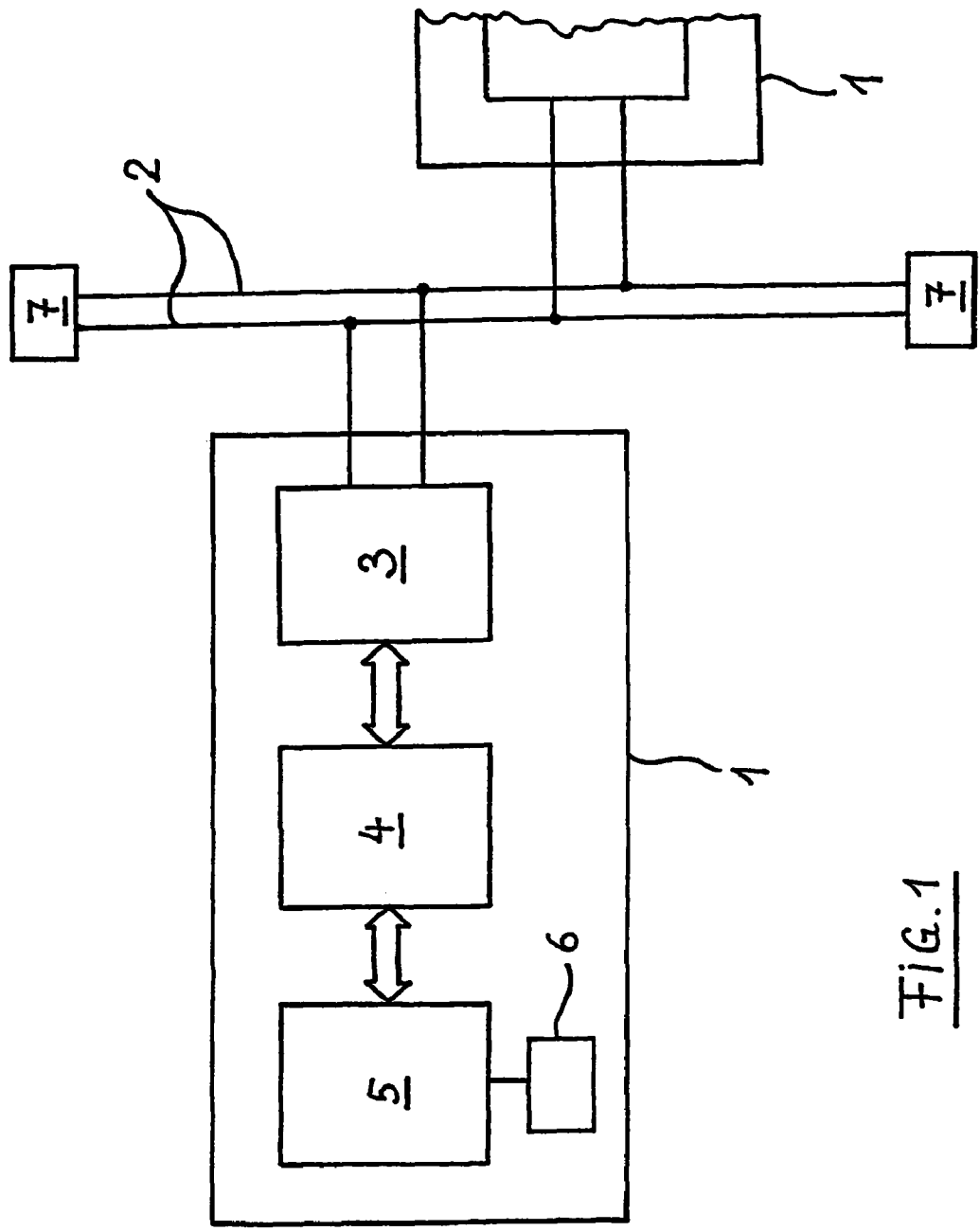
FIG. 1 shows a network according to the invention.

FIG. 1 shows a network according to the invention with several devices 1 which are connected to each other via a transmission device 2 which can be made especially as a twisted two-wire line. In the connected devices 1 those components are shown and described which are necessary for data transmission and control of the network. Application-specific components of the devices 1 (such as for example sensors, actuators, input means, drives and the like) for the sake of simplicity have been omitted. The devices 1 can be especially those which are used within the framework of process automation, therefore generally in automation engineering. The devices 1 can also be PCs.

In the shown device 1 there is a transmitting/receiving means 3 via which the data of the device 1 are delivered to the transmission device 2 and the data which are intended for the respective device 1 are received via the transmission device 2. This means 3 can be called a transceiver which can be made according to the ANSI-TIA-EIA-485-A standard. Likewise the transceiver 3 advantageously contains potential segregation.

Within the device 1 a converter 4 connects the "field bus world" to the "ETHERNET world" and is connected to transceiver 3. This converter 4 controls data transfer from the device 1 to the transmission device 2 and vice versa by serial/parallel conversion of the transmitted/received data by line coding/decoding (NRZ) and by collision detection, pulse shaping.

A control unit 5 which is controlled by a Central Processor Unit (CPU) 6 is connected in turn to converter 4. This control unit 5 controls the access of the device 1 to the network (to the transmission device 2) and also reception of data. Moreover, the control unit 5 is connected to part or all of the other involved components of the device 1 so that by inputting process data into the control unit 5 that process data are converted in the converter 4 and are delivered via the transceiver 3 to the transmission device 2 for further processing in other connected devices. Relay of the received data via the control unit 5 to the involved components of the device 1 takes place vice versa.

For purposes of what is shown in FIG. 1, the transceiver 3, converter 4, control unit 5 and CPU 6 can be individual, combined into groups or all together integrated in an electronic module, a microprocessor or a microcontroller.

In addition, on one or on both ends of the transmission device 2 there is/are one bus termination 7 or two bus terminations 7 which forms/form a wave impedance-correct termination and by which additionally one defined rest level can be impressed onto the field bus.

Figure 2:
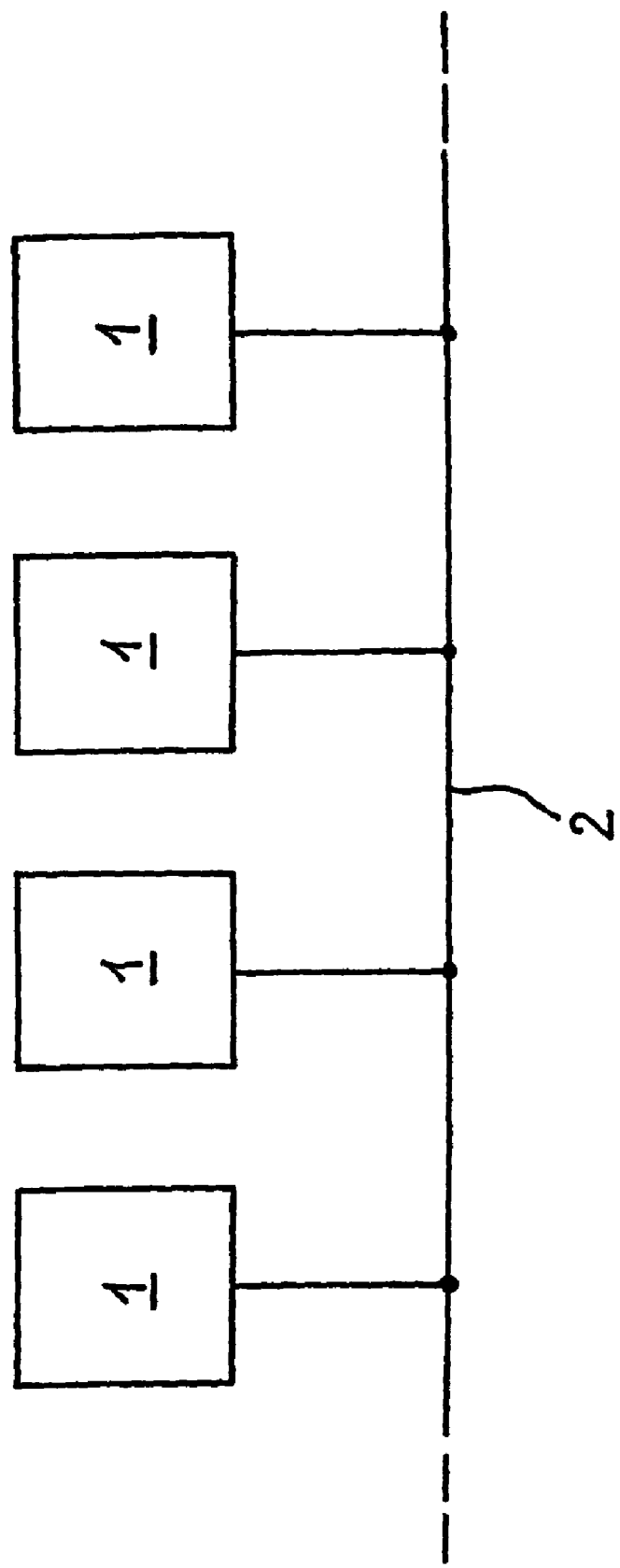
FIG. 2 shows a network with a field bus according to prior art.
Figure 3:
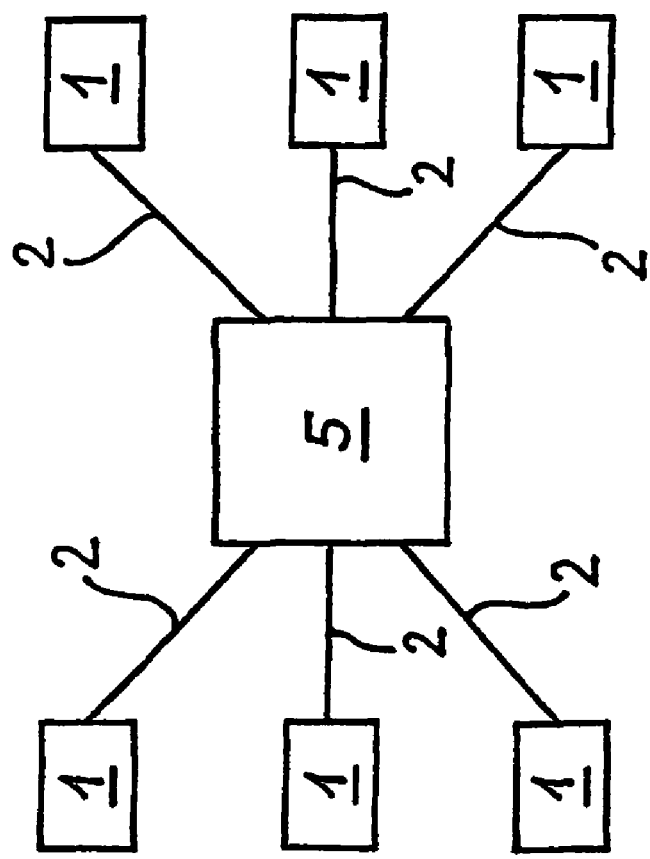
FIG. 3 shows an ETHERNET network with an active distributor according to prior art.

FIGS. 2 and 3 have already been explained within the framework of the description of the known prior art.

The invention claimed is:

1. A data transmission network having at least two devices to transmit and receive data, said network comprising:
a passive transmission device to which each of said devices is connected so that the data is transmitted between said devices over said passive transmission device, wherein the passive transmission device has an operational frequency that is lower than an operational frequency of the devices; and,
each of said devices includes a converter to control data transfer over said passive transmission device to be compatible (i) from each of said devices to said passive transmission device, (ii) between each of said devices, and (iii) to be received by said devices from said passive transmission device,
wherein the data transmitted from and received by said devices is assembled in data packets, each of the data packets including preamble information, and each of said converters replaces the preamble information of each data packet to be transmitted from said device that includes said converter with a variable bit pattern generated for said device, and
wherein collision of two of the data packets are detected by comparison of a transmitted data packet and a received data packet.

2. The data transmission network according to claim 1 further comprising having each of said devices include a control unit disposed to control access between said devices and said passive transmission device for transmission and receipt of the data.

3. The data transmission network according to claim 2 wherein when any one of said control units permits a first data packet from a first device to be transmitted to said passive transmission device and during the transmission of the first data packet said control unit also receives a second data packet from a second device that includes a different variable bit pattern from the variable bit pattern for the first data packet said control unit cancels transmission of the first data packet.

4. The data transmission network according to claim 2 further comprising having each of said devices include a processor disposed to control operation of said control unit of said device.

5. The data transmission network according to claim 3 further comprising a bus termination disposed with said passive transmission device to impress a rest level on said passive transmission device so that transmission of the first and second data packets over said passive transmission device are at low impedance and collision of the first and second packets are detected by comparison at said first and second devices of said transmitted data packet and said received data packet.

6. The data transmission network according to claim 1 wherein each variable bit pattern is randomly generated, and a randomly generated variable bit pattern is automatically assigned to a data packet for replacement of the preamble information.

7. The data transmission network according to claim 1 wherein said converters control data transfer from and to said devices by serial/parallel conversion of data packets by line coding/decoding.

8. The data transmission network according to claim 7 wherein said converters use Non-Return Zero (NRZ) coding.

9. The data transmission network according to claim 1 wherein said passive transmission device is a twisted two-wire line.

10. The data transmission network according to claim 4 further comprising having each of said devices include a transceiver to transmit data to and receive data from said passive transmission device.

11. The data transmission network according to claim 10 wherein each of said devices is an integrated electronic module including said transceiver, said converter, said control unit, and said processor.

12. A method of transmitting electronic data signals over a data transmission network having at least two devices to transmit and receive data, the method includes:
connecting said devices to a passive transmission device;
controlling data transfer from and to each of said devices over said passive transmission device by including a converter with each of said devices to transform the data to be compatible for transfer (i) from each of said devices to said transmission device; (ii) between each of said devices, and (iii) to be received by said devices from said passive transmission device;
wherein the passive transmission device has an operational frequency that is lower than an operational frequency of the devices;
assembling the data to be transmitted from and received by said devices in data packets, each of the data packets including preamble information;
using said converters to replace the preamble information of each data packet to be transmitted from said device that includes said converter with a variable bit pattern generated for said device; and
detecting collisions of a first data packet from a first device and a second data packet from a second device that includes a different variable bit pattern from the variable bit pattern for the first data packet.

13. The method of transmitting electronic data signals according to claim 12 further includes controlling access between said devices and said passive transmission device for transmission and receipt of the data by using control units, wherein each of said devices includes one of said control units.

14. The method of transmitting electronic data signals according to claim 13 further includes using said control unit of the first device to cancel transmission to said passive transmission device of the first data packet during transmission to said passive transmission device of the first data packet when said control unit receives the second data packet.

15. The method for transmitting electronic data signals according claim 13 wherein each of said devices includes a processor disposed to control operation of said control unit of said device.

16. The method of transmitting electronic data signals according to claim 14 further includes disposing a bus termination with said passive transmission device to impress a rest level on said passive transmission device so that transmission of the first and second data packets over said passive transmission device are at low impedance and collision of the first and second packets are detected by comparison at said first and second devices of a transmitted data packet and a received data packet.

17. The method of transmitting electronic data signals according to claim 12 further includes randomly generating variable bit patterns, and assigning a randomly generated variable bit pattern automatically to a data packet for replacement of the preamble information.

18. The method of transmitting electronic data signals according to claim 12 further includes using said converters to control data transfer from and to said devices by serial/parallel conversion of data packets by line coding/decoding.

19. The method of transmitting electronic data signals according to claim 18 wherein said converters use Non-Return Zero (NRZ) coding.

20. The method of transmitting electronic data signals according to claim 12 wherein said passive transmission device is a twisted two-wire line.

21. The method of transmitting electronic data signals according to claim 15 wherein each of said devices includes a transceiver to transmit data to and receive data from said passive transmission device.

22. The method of transmitting electronic data signals according to claim 21 wherein each of said devices is an integrated electronic module including said transceiver, said converter, said control unit, and said processor.

* * * * *